United States Patent [19]
Wong et al.

[11] Patent Number: 5,742,765
[45] Date of Patent: Apr. 21, 1998

[54] COMBINATION LOCAL ATM SEGMENTATION AND REASSEMBLY AND PHYSICAL LAYER DEVICE

[75] Inventors: David Wong, Vancouver; Salman Ghufran, Burnaby; Vernon Robert Little, Belcarra, all of Canada

[73] Assignee: PMC-Sierra, Inc., Canada

[21] Appl. No.: 666,088

[22] Filed: Jun. 19, 1996

[51] Int. Cl.[6] .................................................. G06F 17/00
[52] U.S. Cl. .......................... 395/200.6; 370/465
[58] Field of Search .......................... 395/200.6; 370/392, 370/395, 402, 466, 465, 505, 516, 534

[56] References Cited

U.S. PATENT DOCUMENTS

| | | | |
|---|---|---|---|
| 5,239,544 | 8/1993 | Balzano et al. | 370/465 |
| 5,384,774 | 1/1995 | Martin et al. | 370/395 |
| 5,568,486 | 10/1996 | Huscroft et al. | 370/465 |
| 5,640,399 | 6/1997 | Rostoker et al. | 370/392 |

OTHER PUBLICATIONS

Calderon et al.; "A Chip-Set Enabling B-Isdn ATM Uni Transmission Convergence (TC) AAL 3/4-Layers, and ATM Layer Functions;" 1996 IEEE International Solid-State Circuits Conference.

*Primary Examiner*—Ellis B. Ramirez
*Attorney, Agent, or Firm*—Myers, Liniak & Berenato

[57] ABSTRACT

An ATM network interface comprising a physical layer interface having transmit and receive line interfaces, transmit and receive framers and overhead processors coupled to respective ones of the transmit and receive line interfaces and transmit and receive cell processors coupled to respective ones of transmit and receive framers and overhead processors. The interface further includes a segmentation and reassembly interface coupled to the physical layer interface having transmit and receive ATM and adaptation layer processors coupled to respective ones of the transmit and receive ATM cell processors and a transmit ATM Traffic Shaper coupled to said Transmit ATM and Adaptation Layer Processor, and a coupler to couple the segmentation and reassembly interface to a PCI bus. By incorporating the SAR unit on the same monolithic device as the remainder of the interface, one is able to eliminate the need for expensive external static RAM or SRAM for connection context memory.

15 Claims, 7 Drawing Sheets

COMBINATION LOCAL ATM SEGMENTATION AND REASSEMBLY AND PHYSICAL LAYER DEVICE

FIELD

The present invention relates to a single monolithic ATM network interface device which can be directly interfaced between a physical medium such as a set of SONET/SDH transmission lines and the backplane of a computer such as an ATM peripheral component interconnect (PCI) bus.

BACKGROUND

Existing ATM network interface devices employ a number of discrete devices to carry out the functions of analog clock and data recovery, clock synthesis, a user network interface device which carries out the functions of line side interfacing, framing, cell delineation and cell rate decoupling, a device which performs packet segmentation and reassembly, a bus interface device and local memory for ATM specific connection context and/or direct memory access (DMA) transfer context information. Recently, integration of the analog clock and data recovery and clock synthesis functions was achieved by PMC-Sierra, Inc. However, as yet no one has been able to successfully integrate all of the interface functions in a single monolithic device. Apart from reduced cost, such integration would increase reliability and ease of implementation and permit implementation of ATM Network Interfaces on very small form factor adapter cards.

Accordingly, it is an object of the invention to provide a fully integrated ATM network user interface device for interfacing between a PCI bus and a physical medium. It is a further object to eliminate the need for expensive discrete components in providing external connection context memory.

SUMMARY OF THE INVENTION

According to the invention there is provided an ATM network interface device comprising a physical layer interface having transmit and receive line interfaces, transmit and receive framers and overhead processors coupled to respective ones of the transmit and receive line interfaces and transmit and receive cell processors coupled to respective ones of transmit and receive framers and overhead processors. The interface further includes a segmentation and reassembly (SAR) interface coupled to said physical layer interface having transmit and receive ATM and adaptation layer processors coupled to respective ones of the transmit and receive ATM cell processors and a transmit ATM Traffic Shaper coupled to said Transmit ATM and Adaptation Layer Processor, and means for coupling the segmentation and reassembly interface to a PCI bus. By incorporating the SAR unit on the same monolithic device as the remainder of the interface, one is able to eliminate the need for expensive external static RAM for connection context memory. In addition this incorporation eliminates the interface between a physical layer device and SAR interface and reduces pins, power, etc.

Advantageously, the interface includes a transmit multipurpose port coupled to an input of said transmit ATM and Adaptation Layer processor to allow insertion of cells into a cell stream emanating from said transmit ATM and Adaptation Layer Processor. The interface may also include a receive multipurpose port coupled to an output of said receive ATM and Adaptation Layer Processor to allow cell extraction of cells copied by said receive ATM and Adaptation Layer Cell processor.

Advantageously the transmit and receive framer and overhead processors each include section, line and path overhead processors coupled in series.

The Transmit ATM Traffic Shaper may include an ATM variable bit rate cell scheduler. Incorporation of the scheduler function eliminates the need for an external segmentation and reassembly interface. Preferably the scheduler uses rate counters. The use of rate counters avoids the need for expensive external SRAM.

The coupling means may be a peripheral component interconnect controller coupled to the transmit and receive ATM and Adaptation Layer Processors. The inclusion of a PCI bus controller reduces interface circuitry and provides improved performance due to the tight coupling of the Network Interface with a target bus. The coupling means may further include a direct memory access controller with scatter/gather capabilities.

The interface may include a microprocessor interface for coupling to an external local microprocessor. It may also include a mailbox coupled to the external local microprocessor interface having two mailbox buffers with associated semaphore. One of the buffers may be for PCI Host to microprocessor communication and the other for microprocessor to PCI Host communication wherein registers in said ATM network interface under control of the external local microprocessor can be accessed by the PCI Host only through the mailbox buffers. The features avoids the PCI Host having the interface means to communicated with the microprocessor and further avoids an adapter card for the microprocessor.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION WITH REFERENCE TO THE DRAWINGS

Figure 1:
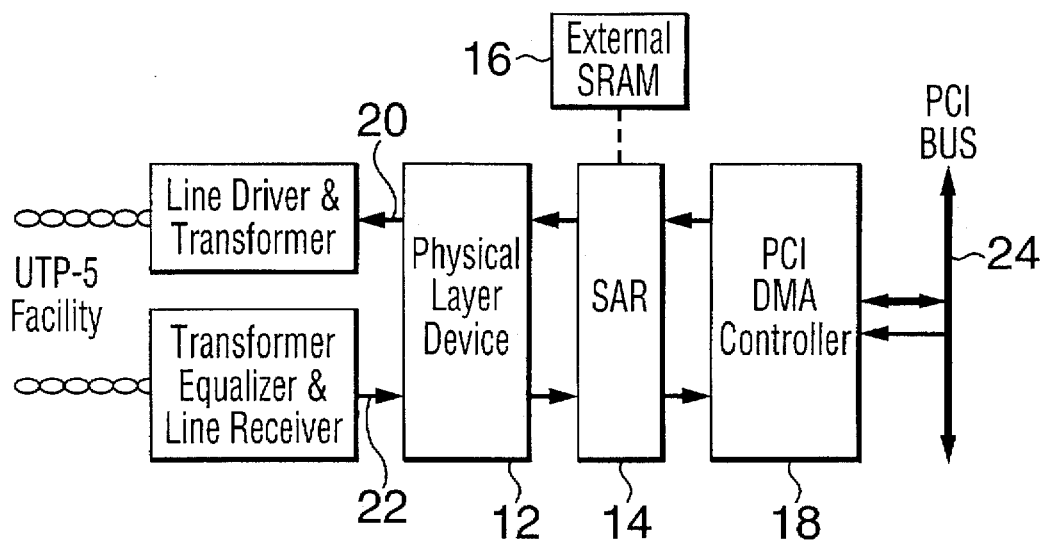
FIG. 1 is a schematic block diagram of existing ATM user network interface systems.

Referring to FIG. 1, existing ATM network interfacing systems for interfacing between a physical layer consisting of transmit 20 and receive 22 lines and a peripheral component interconnect (PCI) bus 24 employ a physical layer device 12, a segmentation and reassembly device (SAR) 14 with external static RAM (SRAM) memory 16 and a PCI/DMA controller 18. The physical layer device 12 performs SONET/SDH transmission convergence which includes cell delineation and header error control (HEC) but not transmission medium characteristics. The segmentation and reassembly device (SAR) provides ATM Adaptation Layer functions to support the simultaneous reassembly and Common Part Convergence Sublayer (CPCS) processing. Finally, the PCI/DMA controller 18 provides an interface to the PCI Local Bus 24 to facilitate data transfer to and from the SAR 14 and physical layer device 12.

Figure 2:
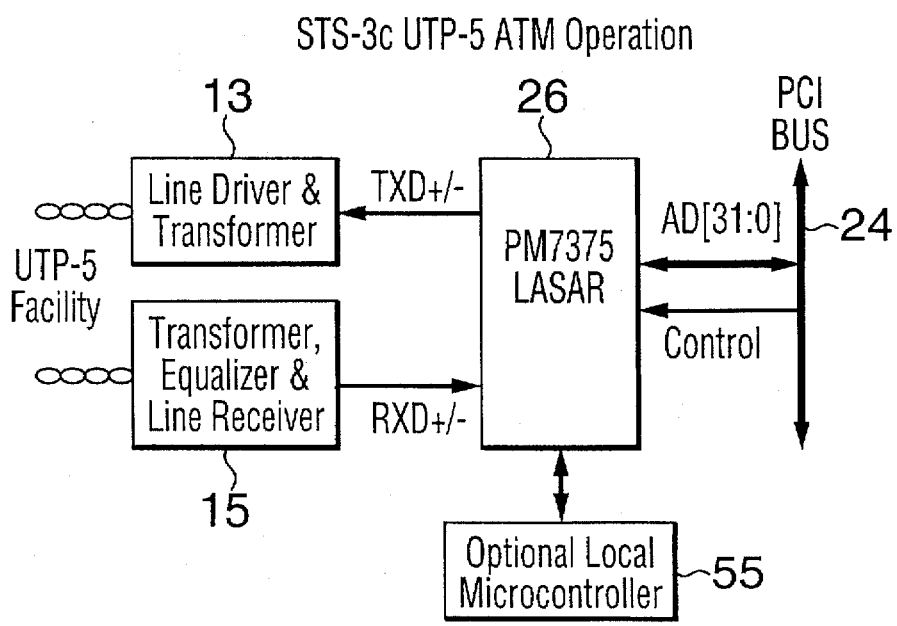
FIG. 2 is a schematic block diagram of the local ATM segmentation and reassembly and physical layer (LASAR) device interfaced to a pair of twisted pair transmission lines.

Referring to FIG. 2 the local ATM Segmentation and Reassembly & physical layer interface device (LASAR) 26 is typically used to implement the core of a SONET STS-3c or STS-1 ATM User Network Interface by which an ATM terminal is linked to an ATM switching system. On the line side the LASAR 26 can be interfaced with twisted pair wiring (UTP-5) through a line driver and transformer 13 on the transmit output and a transformer, equalizer and line receiver 15 which performs fixed equalization and DC restoration for good bit error rate performance. On the system side, the LASAR 26 can be directly attached to a peripheral component interconnect (PCI) bus 24.

Figure 3:
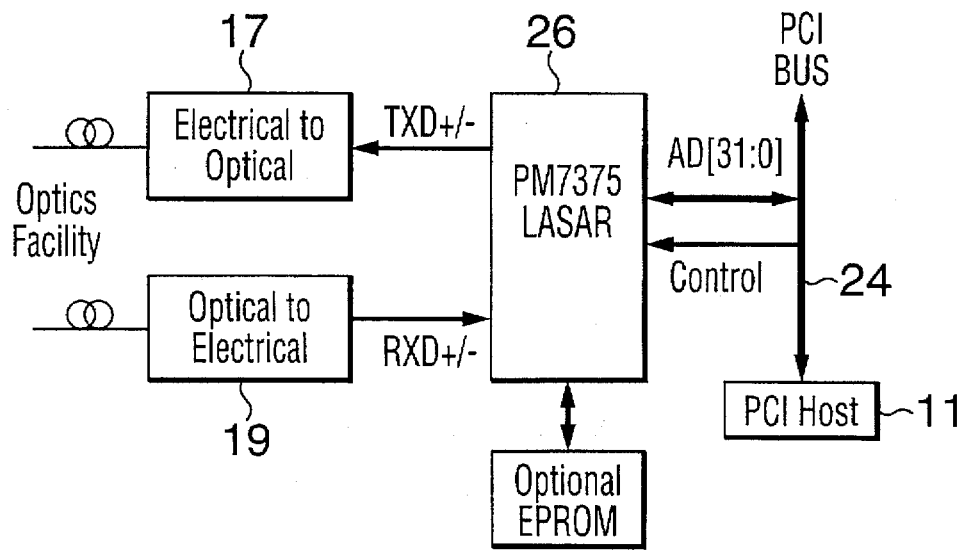
FIG. 3 is a schematic block diagram of the LASAR device interfaced to a pair of optical light fiber lines.
Figure 4:
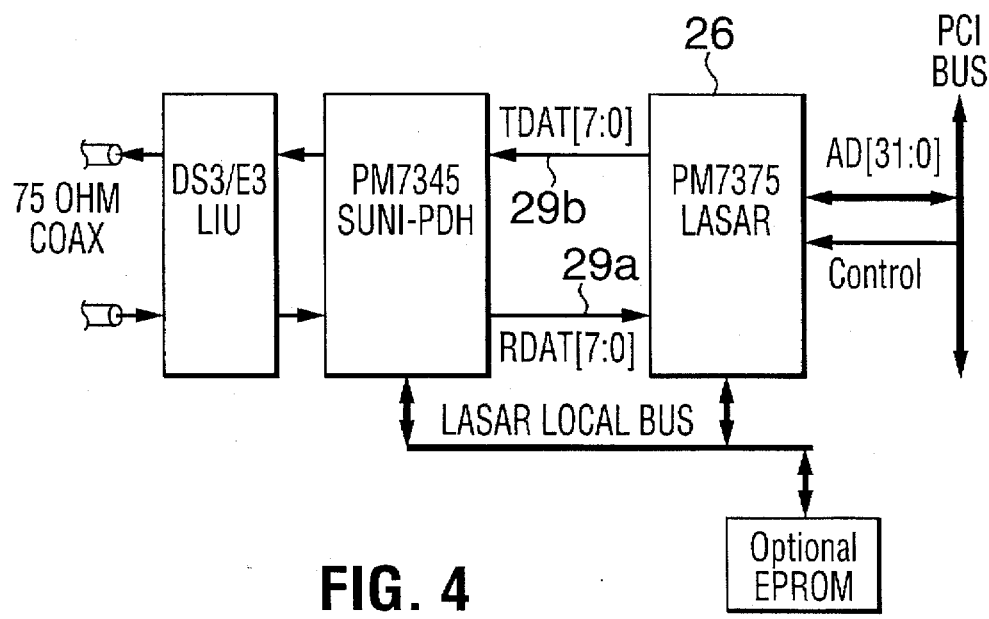
FIG. 4 is a schematic block diagram of the LASAR device interfaced to an external physical layer device using its Saturn Compliant Interface for Physical Layer (SCI-PHY) devices port.

Alternatively, as seen in FIG. 3, the LASAR 26 can be directly connected to optical drivers 17 and 19. Finally, as shown in FIG. 4, the LASAR 26 can interface to an external Physical device using a Saturn Compliant Interface for Physical Layer Device (SCI-PHY) transmit and receive multipurpose ports 29a and 29b, respectively. For the Receive side, in such a configuration, the multipurpose port 29a couples to the input of the Receive ATM & Adaptation Layer Processor 44. For the Transmit side, the multipurpose port 29b couples to the output of the Transmit ATM & Adaptation Layer Processor 42.

Figure 5:
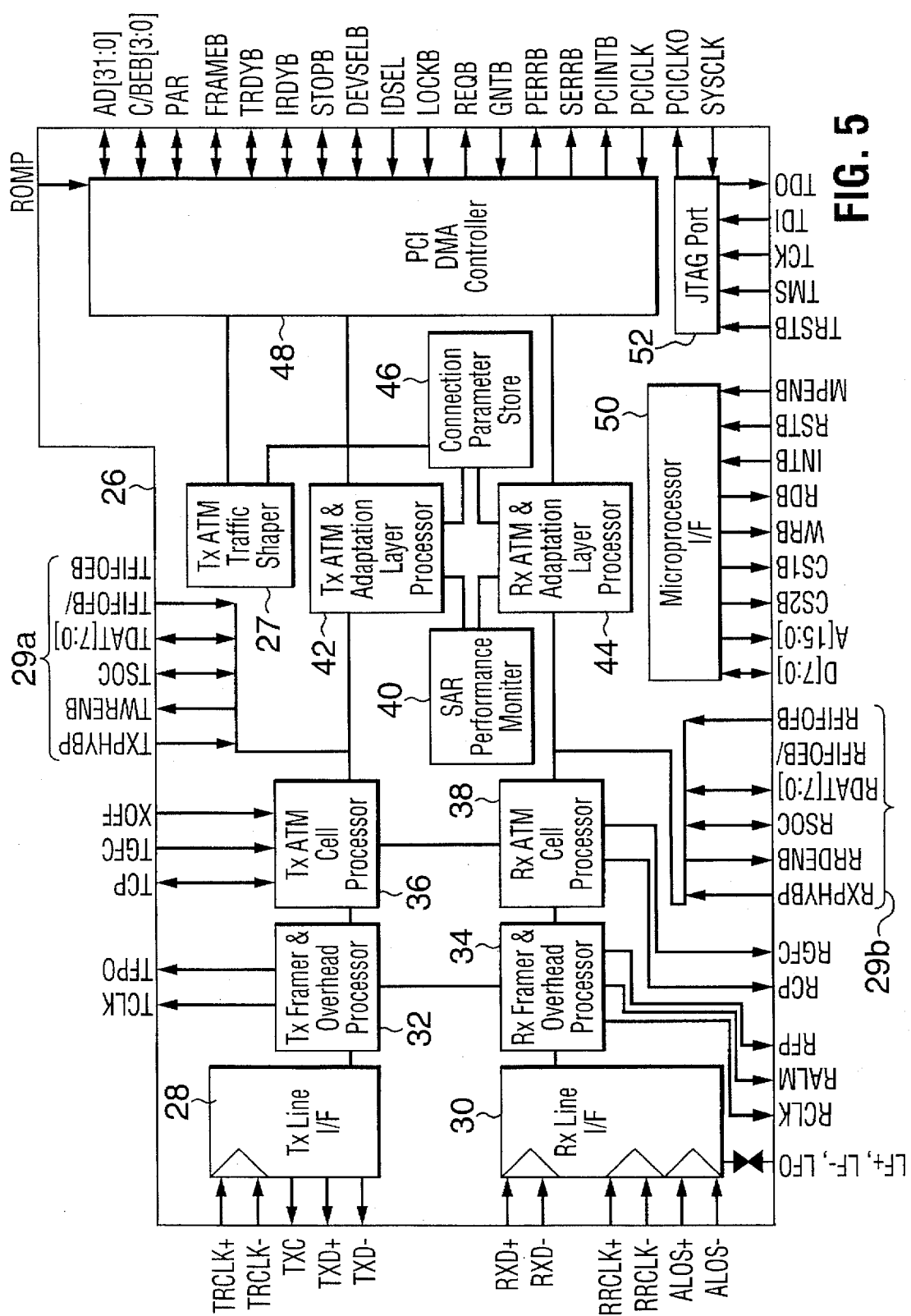
FIG. 5 is a schematic block diagram of the LASAR device.

Referring to FIG. 5 the Local ATM Segmentation and Reassembly & Physical Layer Interface device (LASAR) 26 has a receive line interface 30 and a transmit line interface 28. The receive line interface 30 receives SONET/SDH frames, performs clock and data recovery and serial to parallel conversion. The clock and data recovery unit within interface 30 can be bypassed using register bits to allow interworking the LASAR 26 with an external clock recovery unit. The clock recovery unit recovers the clock from the incoming bit serial data stream. The clock recovery unit uses a low frequency reference clock to train and monitor its clock recovery phase lock loop. Under loss of signal conditions, the clock recovery unit will continue to output a line rate clock that is locked to this reference for keep alive purposes. The clock recovery unit can be configured to utilize reference clocks at 6.48 or 19.44 MHz. The clock recovery unit also supports diagnostic loopback and a loss of signal input that squelches normal input data.

Initially the phase lock loop locks to the reference clock. When the frequency of the recovered clock is within 488 parts per million (ppm) of the reference clock, the phase lock loop attempts to lock to the data. Once in data lock, the phase lock loop reverts to the reference clock if no data transitions occur in 80 bit periods or if the recovered clock drifts beyond 488 ppm of the reference clock.

Figure 6:
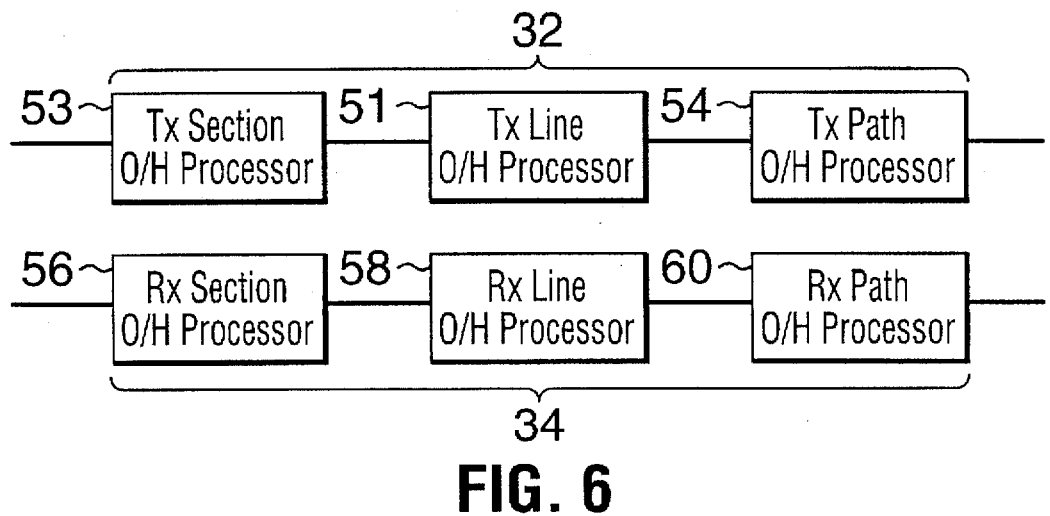
FIG. 6 is a schematic block diagram of the transmit and receive framer and overhead processor shown in FIG. 5.

Interface 30 has a serial to parallel converter which converts the received bit serial SONET stream to a byte serial stream. The serial to parallel converter searches for the SONET/SDH framing pattern in the incoming stream, and performs serial to parallel conversion on octet boundaries. To an output of the receive line interface 30 there is coupled a Receive Framer and Overhead Processor 34 which receives the incoming SONET STS-1/3c stream and performs all the SONET section, line and path overhead processing. Section, line and path processing is performed using Receive Section Overhead 56, Receive Line Overhead 58 and Receive Path Overhead 60 Processors contained within Processor 34 (see FIG. 6).

The Receive Section Overhead Processor 56 provides frame synchronization, descrambling, section level alarm detection and performance monitoring. Frame alignment bytes A1 and A2 in the transport overhead locate the SONET frame in the stream of frames being received. The receiver section overhead processor 56 searches for the A1, A2 bit sequence in the incoming stream. A1 and A2 are not scrambled by the frame synchronous SONET scrambler. While in-frame, the framing bytes (A1, A2) in each frame are compared against the expected pattern. Out-of-frame is declared when four consecutive frames containing one or more framing pattern errors have been received. While out-of-frame, the receive section overhead processor 56 depends on the serial-to-parallel converter in receive line interface 30 to monitor the bit serial data stream for an occurrence of the framing pattern. When a framing pattern has been recognized, the receive section overhead processor 56 verifies that an error free framing pattern is present in the next frame before declaring in-frame.

When in-frame, descrambling is performed using the standard generating polynomial $1+x^6+x^7$. A section bit interleaved parity calculation and verification is automatically performed with errors accumulated into an internal saturating one second (STS3c rate) counter. A loss of signal (LOS) condition is declared when 20±3 μs of all zeros patterns is detected. The LOS is cleared when two valid framing words are detected and during the intervening time, no LOS condition is detected. A loss of frame (LOF) is declared when an out-of-frame (OOF) condition persists for 3 ms. LOF is cleared when an in-frame condition persists for a period of 3 ms. LOF is cleared when an in-frame condition persists for a period of 3 msec.

The receive line overhead processor 58 provides line level alarm detection and performance monitoring. The line far end receive failure (FERF) is set high when line FERF is declared. This occurs when a 110 binary pattern is detected in bits 6,7 and 8 of the K2 byte for five consecutive frames. FERF is removed when any pattern other than 110 is detected in bits 6,7 and 8 of the K2 byte for five consecutive frames. Line alarm indication signal (AIS) is declared when a 111 binary pattern is detected in bits 6, 7, 8 of the K2 byte, for five consecutive frames. Line AIS is removed when any pattern other than 111 is detected in bits 6, 7, and 8 of the K2 byte for five consecutive frames.

Line bit interleaved parity calculation and verification is automatically performed with errors accumulated into an internal saturating one second counter. Accumulation of line far end block error (FEBE) indications into an internal saturating one second counter is also provided.

The receive path overhead processor 60 provides pointer interpretation, extraction of path overhead, extraction of the synchronous payload envelope, path level alarm detection and performance monitoring.

The receive path overhead processor 60 interprets the incoming pointer (H1, H2). A loss of pointer (LOP) in the incoming STS 1/3c is declared as a result of eight consecutive invalid pointers or eight consecutive new Data Flag (NDF) enabled indications. LOP is removed when the same valid pointer with normal NDF is detected for three consecutive frames. Path alarm indication signal (PAIS) in the incoming STS-1/3c stream is declared after three consecutive AIS indications. PAIS is removed when the same valid pointer with normal NDF is detected for three consecutive frames or when a valid pointer with NDF enabled is detected. Path remote defect indication (RDI) is raised when bit 5 of the path G1 byte is set high for five or ten consecutive frames.

The path bit interleaved parity (BIP-8) calculation and verification is automatically performed with errors accumulated into an internal saturating one second (STS-3c rate) counter. Accumulation of path far end block error (FEBE) indications into an internal saturating one second (STS-3c) is also provided.

A receive ATM cell processor 38 is coupled to an output of the receive path overhead processor 60. The receive ATM cell processor 38 performs ATM cell delineation, provides cell filtering based on idle/unassigned cell detection, cell filtering based on HEC error detection, generic flow control field extraction, ATM layer alarm detection and performs ATM cell payload descrambling.

Figure 7:
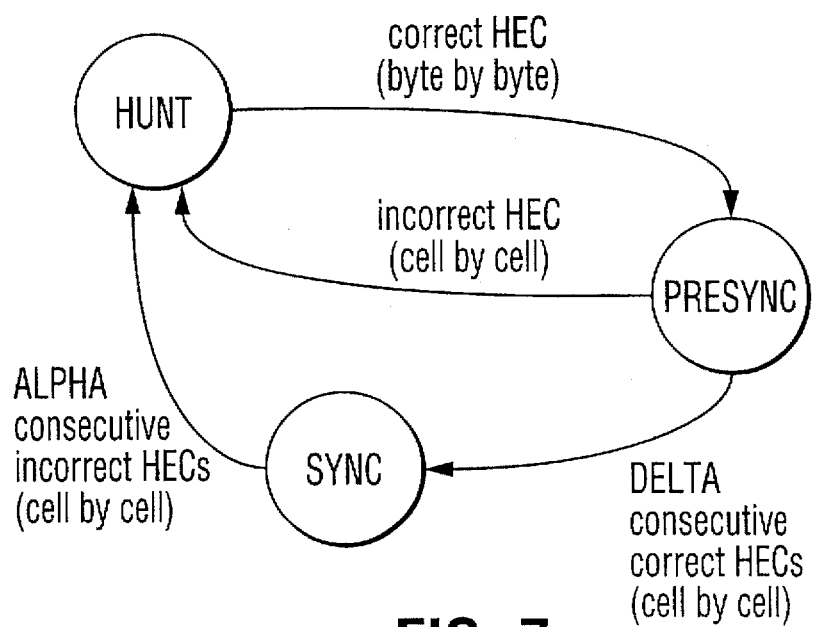
FIG. 7 is a schematic diagram of the cell delineation state diagram.

Cell delineation is the process of framing to ATM cell boundaries using the header error code (HEC) field found in the cell header. The HEC is a cyclical redundancy check (CRC) calculation over the first 4 octets of the ATM cell header. Cell delineation is performed using the Cell Delineation State Diagram shown in FIG. 7. In this case ALPHA is chosen to be 7 and DELTA is chosen to be 6. These values result in a maximum average time to delineate of 31 µs for STS-3c and 93 µs STS-1. When in the HUNT state, the receive ATM cell processor 38 asserts the out of cell delineation (OCD) alarm. If OCD persists for 4 msec, loss of cell delineation is asserted (LCD). LCD is removed when no OCD condition has been detected for 4 ms.

Cells are filtered (or dropped) based on HEC errors and/or a cell header pattern. Cell filtering is optional and is enabled through the receive ATM cell processor 38. When both filtering and HEC checking are enabled, cells are dropped if uncorrectable HEC errors are detected, or if the corrected header contents match the pattern contained in the receive ATM cell processor 38 Match Header Pattern and RACP match header Mask registers. Idle or unassigned cell filtering is accomplished by writing the appropriate cell header pattern into the RACP Match Header Pattern and the RACP Match Header Mask registers.

Figure 8:
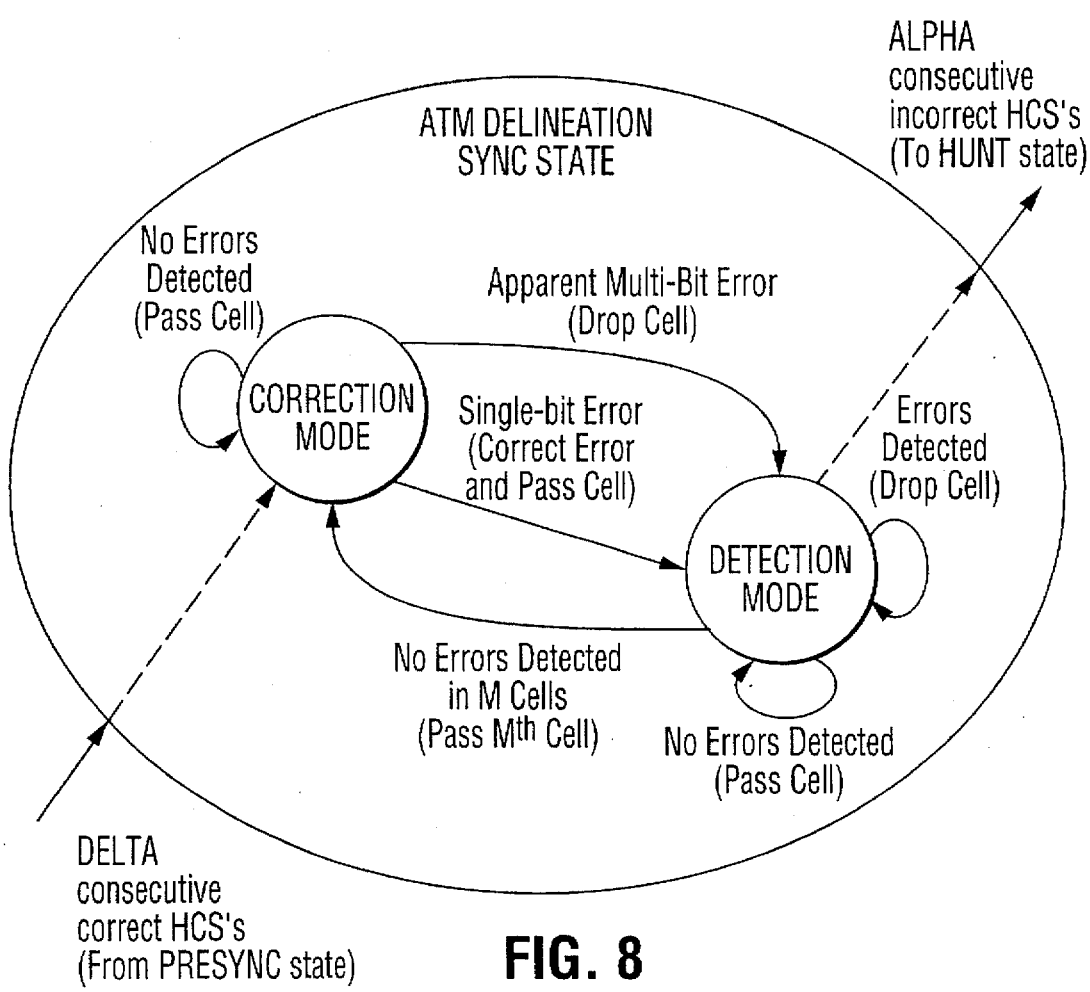
FIG. 8 is a schematic diagram of the HEC Verification state diagram.

The Header Error Code (HEC) is a cyclical redundancy check (CRC-8) calculation over the first 4 octets of the ATM cell header using the polynomial, $x^8+x^2+x+1$. The coset polynomial, $x^6+x^4+x^2+1$ is added (modulo 2) to the received HEC octet before comparison with the calculated result. While the Cell Delineation State Machine (described above) is in the SYNC state, the HEC verification circuit implements the state machine shown in FIG. 8. The two 8-bit saturating one second HEC error event counters are provided to accumulate correctable HEC errors and uncorrectable HEC errors. Counters are enabled only when the RACP is in the SYNC state.

Four GFC bits are extracted and serialized out via output RGFC. The updating of RGFC by particular GFC bits may be disabled through an internal register. By default, RGFC only outputs the state of the most significant GFC bit, thus allowing this output to be used as a XON/XOFF indication for controlled data terminal applications. The serial link is forced low if cell delineation is lost.

The self synchronous descrambler operates on the 48 byte cell payload using the polynomial $x^{43}+1$. The descrambler is disabled for the duration of the header and HEC fields, and may be optionally disabled.

The receive ATM and Adaptation Layer Cell Processor 44 (RALP) performs ATM layer and AAL type 5 (AAL-5) layer processing. In addition, if enabled, the RALP 44 also performs virtual channel (VC) aging and non-activity termination which is basically a global time-out period after which lack of activity results in termination of processing of a packet.

ATM layer processing includes open VC verification, cell filtering, cell copying and CRC-10 verification. Cell filtering is the action of not passing cells to the PCI HOST 11. Cell copying is the action of copying cells to the Multipurpose port 29b by the Receive ATM and Adaptation Layer Processor 44. Cell filtering and cell copying are mutually exclusive. Cells can be copied and/or directed out of the Multipurpose port 29b to a device which performs AAL-1 processing. AAL-1 traffic is generally sensitive to cell delay variations which would be introduced by the PCI bus 24.

For every incoming cell, the RALP 44 must verify that the VPI and VCI header fields correspond to an open VC. Since only 128 VCs are allowed, a subset of the VPI and VCI field bits are required to identify the VC. Selection of which VPI and VCI bits contribute to the formation of the VPI/VCI code is programmable. If a cell arrives and its VPI/VCI code does not identify an open VC, the cell is filtered.

Given that the incoming cell can be associated with an open VC, the RALP 44 block interprets the payload type index (PTI) fields to identify what payload is being carried. For F4 and F5 OAM cells, the CRC-10 is optionally verified using the polynomial, $x^{10}+x^9+x^5+x^4+1$. F4 flows are at the virtual path level while F5 flows are at the virtual channel level. If configured, cells can be filtered based on illegal payload type index (PTI) codepoints (110, 111), F5 OAM flows (100, 101), specific VPI/VCI codes (i.e. F4 OAM cells) or cells with CRC-10 errors. Filtered cells are not passed onto the PCI HOST 11 and are accumulated in the SAR Performance Monitoring block 40. Cell copying is only supported if the LASAR's 26 receive Multipurpose Port 29b is enabled to source cells using input RXPHYBP. If enabled as a cell source, cell copying to the Multipurpose Port can be based on the VPI/VCI code and/or PTI codepoints.

The AAL Layer processing includes Common Part Convergence Sublayer AAL Type 5 Protocol Data Unit (CPAAL5PDU) reassembly and verification. In addition, a mechanism for smooth reassembly startup and smooth reassembly shutdown is provided. The RALP 44 performs CPAAL5PDU reassembly by associating cells with the same VPI/VCI code with a CPAAL5PDU. The normal indication of the end of a CPAAL5PDU is provided using a PTI codepoint while the start of a CPAAL5PDU is implicit based on the CPAAL5PDU end indication. When a VC is first provisioned for reception and a cell for the VC arrives, the RALP 44 starts to reassemble a CPAAL5PDU. As additional cells of a CPAAL5PDU are received, the RALP 44 continues to accumulate cells for a given CPAAL5PDU until the CPAAL5PDU is terminated either normally or abnormally through an exception. Reassembly is facilitated using the PCI DMA Controller 48.

Normal termination of a CPAAL5PDU results from the reception of a cell with the appropriate PTI codepoint and valid CPAAL5PDU length, control and CRC-32 fields. The CRC-32 polynomial used is the following:

$$x^{32}+x^{26}+x^{23}+x^{22}+x^{16}+x^{12}+x^{11}+x^{10}+x^{8}+x^{7}+x^{5}+x^{4}+x^{2}+x+1$$

Abnormal termination of a CPAAL5PDU can result from either CPAAL5PDU length exceptions, Control field exceptions, CRC-32 exceptions or reassembly time-outs. Length exceptions can result from either the receive CPAAL5PDU LENGTH field not matching the received number of CPAAL5PDU octets, the receive CPAAL5PDU LENGTH field equal to zero (indicating a forward abort) or the received CPAAL5PDU exceeding the maximum CPAAL5PDU size. If the current CPAAL5PDU under reassembly exceeds the maximum CPAAL5PDU size, the CPAAL5PDU is terminated and all additional cells received are dropped until the last cell of the CPAAL5PDU is received. The maximum CPAAL5PDU size can be user programmed. Control field exceptions result when the received CPAAL5PDU CPI field is non zero. A CRC-32 exception results when the calculated CRC-32 over the received CPAAL5PDU does not produce the expected residue. Reassembly time-outs are discussed below under the Packet Aging description section. If an exception is indicated the CPAAL5PDU is marked and passed to the PCI HOST 11 with an error indication.

The RALP block 44 also provides smooth reassembly shut down. Through user control, the RALP can be configured to either stop reassembly on a VC immediately or after the current CPAAL5PDU has been reassembled.

Packet aging is used to protect the LASAR 26 from slow or dead connections holding receive buffer resources for an unacceptable duration. It allows automatic termination of protocol data unit (PDU) under reassembly when the packet exceeds a global time-out period. The global time-out period can be user configured to be between 2.73 µs and 130 s.

A connection parameter store block 46 couples to the RALP 44 (and to Transmit ATM and Adaptation Layer Processor 42 and Transmit ATM Traffic Shaper 27) and provides the internal VC parameter storage for both the 128 receive VCs and 128 transmit VCs. The connection parameter store block 46 provides VC parameter access to the RALP, a Transmit ATM Traffic Shaper (TATS) block 27 and the Transmit ATM and Adaptation Layer Cell Processor (TALP) 42. In addition, indirect access to the parameter memory space is also provided to the microprocessor 50 and PCI HOST 11 (not shown).

The SAR Performance Monitor Block 40 interfaces directly to the RALP and PCI/DMA Controller 48, and accumulates ATM Cell unprovisioned VPI/VCI errors, ATM Cell CRC-10 errors, Receive CPAAL5PDU Invalid Common Part Indicator errors, Receive CPAAL5PDU Invalid SDU Length errors, Receive CPAAL5PDU CRC-32 errors, Receive CPAAL5PDU Oversize SDU errors, Receive CPAAL5PDU Abort errors, Receive CPAAL5PDU Count, Receive CPAAL5PDU Time-outs Count, Receive Buffer errors, Transmit CPAAL5PDU Oversize SDU errors, and Transmit CPAAL5PDU Count. Counts are accumulated in saturating counters. ATM Cell counters are sized such that they can be polled once per second. Packet registers are sized such that they can be polled once per second given that every CPAAL5PDU is in error and the average packet size is 8 cells. If CPAAL5PDU characteristics are different and exact CPAAL5PDU counts must be maintained, the user must poll every 125 ms. When the RACP block declared loss of cell delineation (LCD), no receive statistics are accumulated except for Time-outs.

The user can indicate the end of an accumulation interval by writing to the SAR Performance Monitor 40 register space or to the LASAR 26 Master Reset and Identity/Load Meters register. Either writes will transfer the current counter values into visible registers and will reset the counters to begin accumulating error events for the next interval. Writing to the SAR Performance Monitor 40 space initiates transfers for SAR Performance Monitor 40 block counters only. Writing to the LASAR Master Reset and Identity / Load Meters register initiates transfers for all counters in all blocks (i.e. RSOP, RLOP, RPOP, RACP AND TACP).

The Transmit ATM Traffic Shaper (TATS) block 27 is coupled to the PCI/DMA Controller 48 and to the Connection Parameter Store 46 and provides for peak rate enforcement using peak rate queues and average cell rate enforcement using peak rate queues coupled with token bucket averaging. In addition, VC's can be classified as Variable Bit Rate (VBR) or Arbitrary Bit Rate (ABR). For ABR VC's, cell transmission is subject to a credit counter (not shown).

Figure 9:
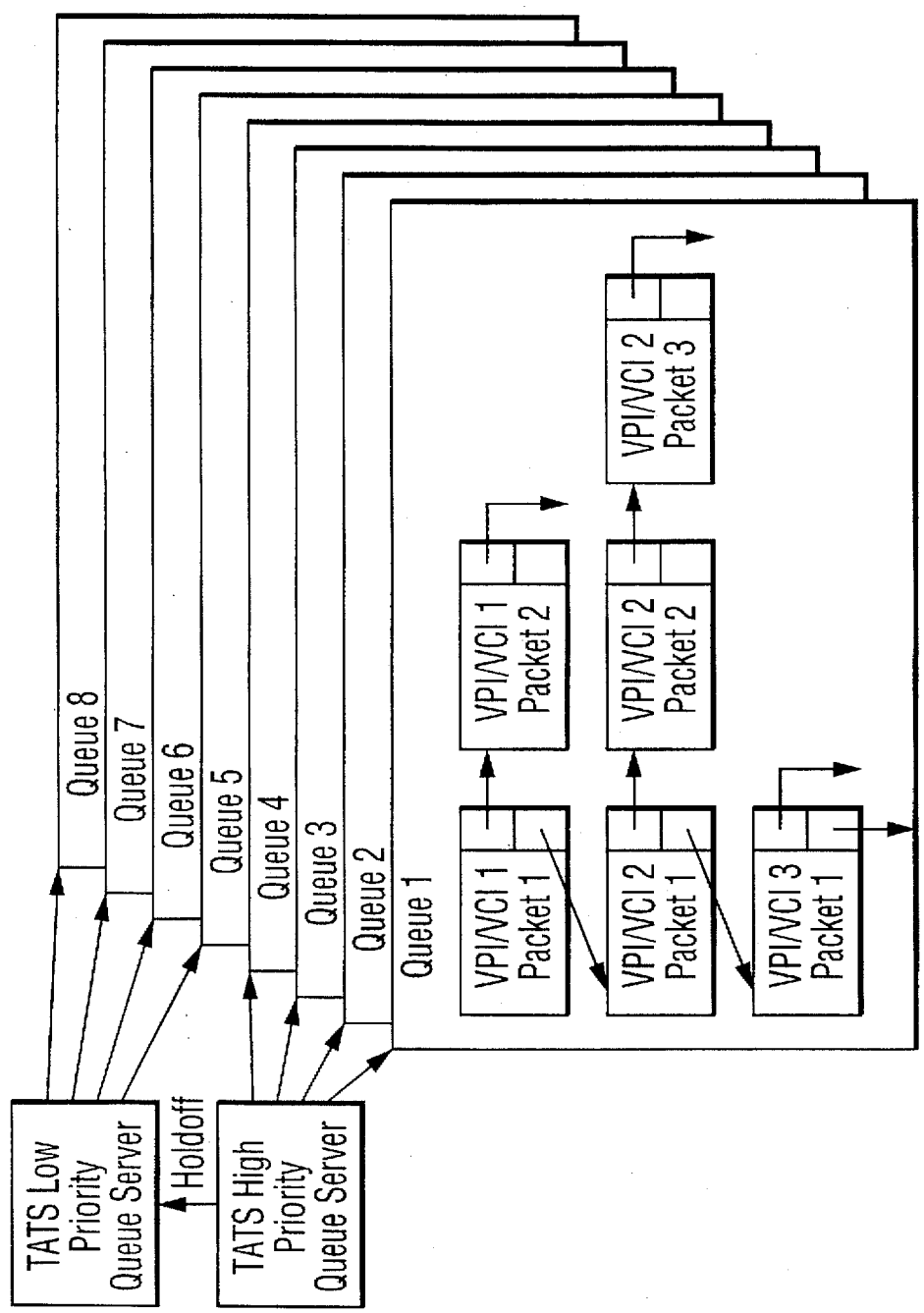
FIG. 9 is a schematic diagram of the of the transmit ATM traffic shaper rate queue structure.

Referring to FIG. 9, the TATS block 27 provides for eight peak rate queues arranged as a group of four high priority queues and a group of four low priority queues. As part of the provisioning process, a VC must be associated with one of the eight rate queues. Once a VC is provisioned, packets supplied by the PCI HOST 11 are attached to the associated rate queue as conceptually shown below. Successive packets of an existing VC are linked to the existing packets waiting to be transmitted over the VC in question.

To enforce fairness, rate queues are serviced in a round-robin fashion on a per queue group basis. High priority queues are serviced in a round-robin manner before the low priority queues. If the high priority queues consume all the available link bandwidth, the low priority queues are allowed to starve. An indication is provided to indicate if any queue has experienced a starvation condition. Servicing of low priority queues is allowed to be pre-empted by high priority queues. Once the TATS 27 begins to service a high priority queue, the queue will be completely serviced before another queue is serviced.

The TATS 27 allows packet transmission at either the peak cell rate or the sustained cell rate based on the generation of tokens. The peak cell rate transmission is defined on a per VC basis by associating an VC with one of the eight rate queues and by selecting whether to use 100%, 50% or 25% of the peak rate provided by the queue. Sustained transmission is defined on a per VC basis by allowing generation of token at the peak cell rate or at some derivative ($1/n$ where $n=1$ to 8) of the peak cell rate.

The TATS 27 provides each VC a token bucket of selectable size. Transmission over a VC is only permitted if the VC's bucket contains a token. Given that the link is idle, the TATS 27 will fill a VC's token bucket at the SCR until either the bucket is full or until a packet needs to be transmitted. If the bucket becomes full, additional generated tokens are discarded. If a packet needs to be segmented and transmitted over a VC, the TATS 27 transmits cells at the peak cell rate consuming one token for every cell transmitted. Transmission at the peak cell rate is maintained until the bucket is empty. In this way, the maximum burst is defined by the selectable bucket capacity. When the bucket is empty, transmission continues at the sustained cell rate or the rate of token generation.

VCs can be classified as Variable Bit Rate (VBR) or Arbitrary Bit Rate (ABR). Regardless of classification, both types of VCs are subject to peak cell rate and sustained cell rate traffic shaping as described above. However, in addition to peak cell rate and sustained cell rate shaping, for ABR VCs, the TATS 27 maintains an aggregate credit count to allow the network to back pressure transmission. A user programmable number of credits are issued by the network using the second most significant bit of the GFC field in the cell flow from the network to LASAR 26. After each ABR cell transmission, the TATS 27 decrements the credit count. ABR cell transmission continues until the credit supply is exhausted at which point the TATS 27 suspends transmission until the network issues more credits.

The Transmit ATM and Adaptation Layer Cell Processor (TALP) 42 which has an input coupled to the PCI/DMA Controller 48 and an output coupled to a Transmit ATM Cell Processor 36, performs ATM layer and AAL (Type 5) layer processing. The TALP block 42 performs packet segmentation with the help of the TATS 27 and the peripheral component interconnect and direct memory access controller (PCID) 48. The TATS block 27 schedules when cells from a CPAAL5PDU under segmentation should be sent. The PCID 48 block actually performs the segmentation and retrieves the packet's bytes. The TALP block 42 aids in segmentation by calculating the CPAAL5PDU's CRC-32 field and adding the CPAAL5PDU CRC-32 fields to form the entire CPAAL5PDU. The CRC-32 polynomial used is:

$$x^{32}+x^{26}+x^{23}+x^{22}+x^{16}+x^{12}+x^{11}+x^{10}+x^8+x^7+x^5+x^4+x^2+x+1$$

The ATM Layer processing includes generating the generic flow control (GFC), virtual path identifier (VPI), virtual channel identifier (VCI), payload type indicator (PTI) and cell loss priority (CLP) cell header fields and optionally generating the CRC-10 field for each cell transmitted. In addition, the TALP block 42 provides the ability to multiplex cells in from the Multipurpose Port 29a and to enforce and aggregate peak cell rate (APCR). The GFC, VPI and VCI fields are inserted from the values programmed when the VC was initially provisioned. The PTI and CLP fields are inserted from the default values established when the VC was initially provisioned or as specified by the PCI HOST 11 on a per packet basis.

The multipurpose port 29a is provided to allow either insertion of the constant bit rate (CBR) cells and/or OAM cells into the cell stream through the Transmit ATM & Adaptation Layer Processor 42. Priority may be given either to the cell stream from the PCI bus 24 passing through the PCI/DMA controller 48 or that from the multipurpose port 29a. If priority is given to the multipurpose port 29a, the latter can be used to support the maintenance of a constant bit rate cell stream. A constant bit rate cell stream (CBR) is sensitive to cell delay variation that can be presented by the PCI bus 24. The multipurpose port 29a can be connected to a an AAL-1 processor to source the CBR stream.

When the port 29a indicates that a cell is ready to be transmitted, the TALP 42 inserts the cell into the aggregate cell stream at the earliest opportunity without any per VC traffic shaping. The only traffic shaping this cell stream experiences is the traffic shaping applied on the aggregate cell stream for all cells sourced from the multipurpose port 29a. The TALP block 42 enforces an aggregate peak cell rate (APCR) on the aggregate cell stream using a peak cell rate counter. The aggregate peak cell rate (APCR) can be selectable from 32 Kbps to the full rate of 149 Mbps.

CRC-10 field generation and inclusion is provided to support F4 and F5 OAM cell generation. For F4 and F5 OAM cells, the CRC-10 is generated using the polynomial, $x^{10}+x^9+x^5+x^4+1$. The OAM cell flow is expected to be either from the PCI HOST 11 or through the Multipurpose port 29a. When through the Multipurpose port 29a, the ATM header bytes GFC, VPI, VCI, PTI AND CLP must be pre-pended by the external cell source.

The Transmit Cell Processor 36 (TACP) provides rate adaptation via idle/unassigned cell insertion, provides HEC generation and insertion, provides GFC insertion and performs ATM cell scrambling. Idle/unassigned cells are transmitted in the absence of assigned cells. Registers are provided to program the GFC, PTI, and CLP fields of the Idle/Unassigned cell header and cell payload. The HEC is automatically calculated and inserted. The HEC calculation over the first four header octets is performed using the polynomial, $x^8+x^2+x+1$. The coset polynomial, $x^6+x^4+x^2+1$ is added (modulo 2) to the residue.

Scrambling is performed using the self synchronous scrambler, $x^{43}+1$. Scrambling is performed only over cell payloads; cell headers are not scrambled.

The Transmit Framer and Overhead Processor block 32 inserts all path, line and section overhead bytes in the outgoing SONET STS-1/3c stream. Section, line and path overhead processing is performed using the Transmit Section Overhead 53, Transmit Line Overhead 51 and the Transmit Path Overhead 54 Processors, all contained within processor 32.

The Transmit Section Overhead Processor (TSOP) 53 provides frame pattern insertion (A1, A2), section BIP-8 (B1) insertion, scrambling and section level alarm signal insertion.

The section BIP-8 code is based on a bit interleaved parity calculation using even parity calculated over all SONET frame bytes. The calculated BIP-8 code is inserted into the B1 byte of the following frame before scrambling. Scrambling is performed using the generating polynomial $1+x^6+x^7$. All bytes of the SONET frame are scrambled except the framing bytes (A1, A2) and the identity bytes (C1).

The Transmit Line Overhead Processor (TLOP) 51 provides line level alarm signal insertion and line BIP-8/24 insertion (B2). The line BIP-8/24 code is based on a bit interleaved parity calculation using even parity calculated over all SONET frame bytes except the section overhead bytes. The calculated BIP-8/24 code is inserted into the B2 byte(s) of the following frame. For alarm assertion and diagnostics, line FERF can be forced (K2), line FEBE can be automatically accumulated and inserted (Z2) and BIP-8/24 errors may be continuously inserted.

The Transmit Path Overhead Processor (TPOP) 54 provides transport frame alignment generation, pointer Generation (H1, H2), path overhead insertion, insertion of the synchronous payload envelope, path BIP-8 (B3) insertion and the insertion of path level alarm signals. The TPOP 54 generates the outgoing pointer as specified in the references. On startup, the pointer value defaults to 522, the byte after C1 byte. The path BIP-8 code is based on a bit interleaved parity calculation using even parity calculated over all SONET synchronous payload envelop (SPE) bytes. The calculated BIP-8 code is inserted into the B3 byte of the following frame.

For alarm assertion and diagnostics, path Remote Defect Indication (RDI) can be forced, path FEBE can be automatically accumulated and inserted (G1), BIP-8 errors may be continuously inserted and pointers can be incremented, decremented or arbitrarily forced.

The Transmit Line Interface block 28 performs clock synthesis and performs parallel to serial conversion. The clock synthesis unit can be bypassed using register bits to allow operation with an external line rate clock source.

The Transmit clock may be synthesized from a 19.44 MHz reference, yet attenuate high frequency jitter on the reference signal. This transfer function yields a typical low pass corner of 1 MHz, above which reference jitter is attenuated at 3 dB per octave. The design of the loop filter and phase lock loop is optimized for minimum intrinsic jitter. With a jitter free reference, the intrinsic jitter is less than 0.01 UI RMS when measured using a high pass filter with a 12 kHz cutoff frequency.

The JTAG port 52 is a Test Access Port which provides JTAG support for boundary scan.

The PCI/DMA Controller Interface 48 provides an interface to the PCI Local Bus 24 to facilitate data transfer to and from the LASAR 26. When the LASAR 26 is the initiator, the PCID 48 uses burst DMA cycles to read or write data on the PCI Bus 24 which minimizes PCI Host bus traffic. When the LASAR 26 is the target, the PCID 48 allows the PCI Host 11 to access the LASAR's internal registers, to communicate with the microprocessor or access external devices when the microprocessor is not present. Communication with an optional microprocessor is facilitated using a mailbox scheme.

The PCID 48 provides two transmit and two receive DMA channels to move packets to and from the LASAR 26. The receive DMA channels are divided into management data and packet data channels. The transmit DMA channels are divided into high priority and low priority channels. The DMA channels support scatter/gather buffer manipulation to allow for flexible and independent operation with the PCI HOST 11.

The PCID 48 services the four DMA channel using either a round-robin scheme or a receive priority scheme. For the round-robin scheme, simultaneous DMA requests are serviced in a fair rotational manner. For the receive priority scheme, receive DMA requests are always serviced before transmit DMA requests. Selection can be made by the user. In the transmit direction, a eight cell queue is provided to allow prefetching of transmit cells to account for PCI bus latency. In the receive direction, a 96 cell queue is provided to allow for a worst case 270 µs PCI Bus latency.

The PCID 48 interface is compliant with the PCI Local Bus Specifications Version 2.0. When operating as the target, the PCI interface provided access to the LASAR 26 registers to configure the LASAR 26, monitor the LASAR and to control the DMA queues.

A mailbox scheme is provided to allow the PCI HOST 11 to communicate with an external optional Microprocessor. Two 8 by 16 buffers with associated semaphores are provided. One buffer is used for PCI HOST 11 to Microprocessor communication while the other buffer is used for Microprocessor to PCI HOST 11 communication.

Figure 10:
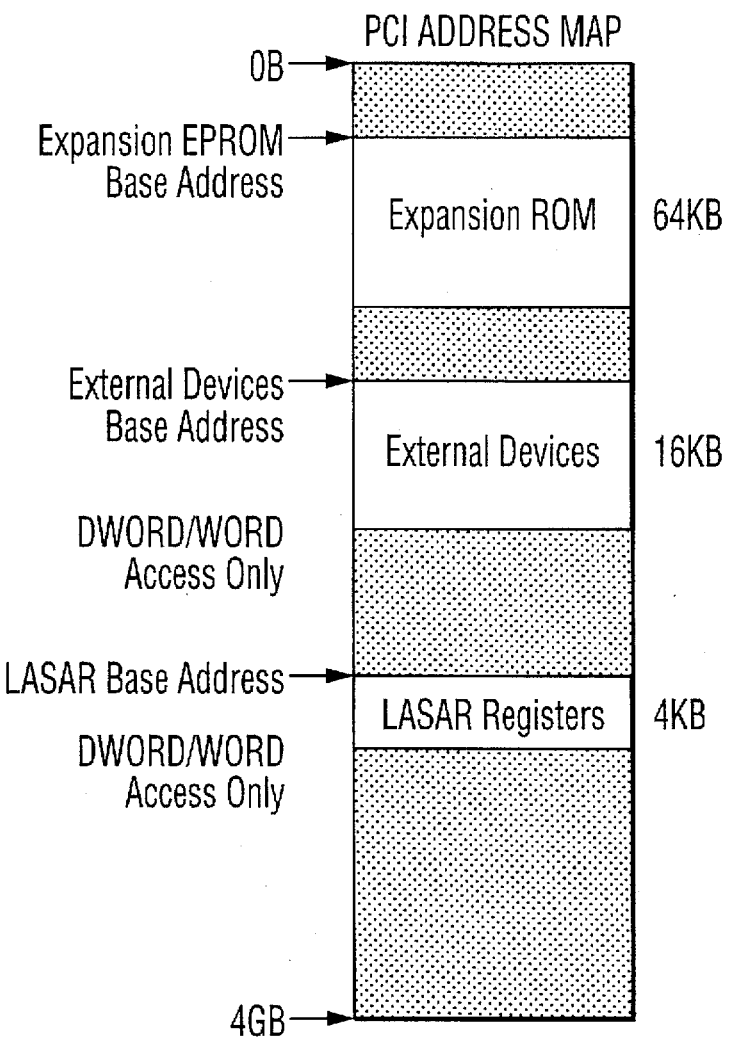
FIG. 10 is a schematic diagram of the LASAR address map.

When the local microprocessor is present in the system, as indicated when the MPENB pin is sampled low, the PCI HOST 11 can only access dedicated registers. As seen in FIG. 10 the base of the LASAR's internal address space is set via the LASAR Memory Base Address register in the PCI Configuration memory space. The maximum size of the memory space is 4K Bytes. If the PCI HOST 11 wishes to access any registers controlled by the local microprocessor it must do so via the mailbox.

When the local microprocessor is not present, the PCI HOST 11 has direct access to all registers in the LASAR 26. In addition the PCI HOST 11 can access an Expansion EPROM and External devices via the LASAR Local Bus. The base of the LASAR's internal address space is set via the LASAR Memory Base Address register in the PCI configuration memory space. The maximum size of the memory space is 4K Bytes. The Expansion EPROM space is set by the Expansion ROM Base Address Register in the PCI configuration memory space. The maximum size of the memory space is 64K Bytes. The External device space is 16K Bytes maximum and is located using the External Device Memory Base Address register in the PCI Configuration memory space. The LASAR's PCI address map is shown in FIG. 10. Both the LASAR Memory and External Device Memory is DWORD and WORD accessible only.

The transmit DMA channels are controlled using the Transmit Request Machine (TRM). The TRM receives segmentation requests from the TATS block, retrieves packet bytes using the PCI Interface and provides the bytes to the TALP block for inclusion into cells. All transmit DMA data transfer actions are performed with minimum PCI Host interaction with the aid of internal per VC storage.

PCI Host communication is provided using Transmit Descriptors (TD), a Transmit Descriptor Reference Free (TDRF) Queue and a Transmit Descriptor Reference Ready (TDRR) High and Low Priority Queues. All four data structures are found in the PCI Host memory space and are referenced using LASAR registers. A TD is a thirty-two byte data structure which can be used by the PCI HOST 11 to describe a packet or a portion of a packet. The TDRF and TDRR Queues are used as communication mechanisms for communicating between the PCI Host 11 and the LASAR 26. TDRR high and low priority queues are used to pass TD References from the PCI host 11 to the Lasar 26. In this case TD's describe packets to transmit and can be a linked list. The TDRF queue is used to pass TD References from the Lasar 26 to the PCI Host 11. In this case, TD's are packets that have been segmented and transmitted.

The TATS block 27 provides for peak rate enforcement using peak rate queues and average cell rate enforcement using peak rate queues coupled with token bucket averaging. The TATs block 27 uses eight peak rate queues arranged as a group of four high priority queues and group of four low priority queues. A VC must be associated with one of the eight rate queues. Packets supplied by the PCI Host 11 are attached to the associated rate queue as conceptionally shown in FIG. 9. Successive packets of an existing VC are linked to the existing packets waiting to be transmitted over the VC in question.

Each Transmit Descriptor (TD) must reside in the Transmit Descriptor Table in the PCI Host Memory. The Transit Descriptor table can contain a maximum of 16384 TDs. The base of the Transmit Descriptor Table is user programmable using the PCI DMA Controller Interface (PCID) Transmit Descriptor Table Base (TDTB) register. Each TD can be located using a Transmit Descriptor Reference (TDR) combined with the TDTB register.

The receive DMA channel is controlled using a Receive Request Machine (RRM). The RRM receives cell payloads associated with an open VC from the Receive ATM Adaptation Layer Processor (RALP) block 44. Payloads are assumed to be either management cells or part of a packet under reassembly. For management cells, the payload is burst written into PCI Host memory and the host 11 is alerted. Some flexibility is provided to allow for the accumulation of several cells before the PCI Host 11 is alerted. For payloads of packets under reassembly, the payload is burst written into PCI Host memory but the PCI Host is not alerted until the complete packet has been reassembled. All DMA burst data transfers are performed with minimum PCI Host interaction with the aid of internal per VC storage.

For packets, PCI Host communication is provided using Receive Packet Descriptors (RPD), a Receive Packet Descriptor Reference Small Buffer Free (RPDRSF) Queue, a Receive Packet Descriptor Reference Large Buffer Free (RPDRLF) Queue and a Receive Packet Descriptor Reference Ready (RPDRR) Queue. Two free queues are provided to allow for flexible buffer sizes. For large buffers the RPDRLF Queue and for small buffers the RPDRSF Queue. All four data structures are located in PCI Host memory. A RPD is a thirty two byte data structure set up by the PCI Host and used by the LASAR to describe a packet or a portion of a packet.

For management cells, PCI Host communication is provided using Receive Management Descriptors (RMD), a Receive Management Descriptior Reference Free (RMDRF) Queue and a Receive Management Descriptior Reference Ready (RMDRR) Queue. All three data structures are located in PCI Host memory. A RMD is a thirty two byte data structure set up by the PCI Host and used by the PCI Host to describe a management cell.

RPDRs point to free RPD and are passed from the PCI Host 11 to the RRM using the Receive Packet Descriptor Reference Small Free (RPDRSF) and the Receive Packet Descriptor Reference Large Free (RPDRLF) Queues. The RRM uses a free RPD for Packet reassembly. Two free queues are used by the RRM, the RRPDLF Queue for large buffers and the RPDRSF Queue for small buffers. At the start of packet reception the RRM will use a small buffer to store the start of a packet. If the packet exceeds the small buffer size, the RRM will use large buffers to store the remainder of the packet. When a packet has been assembled, the RPDR of the first RPD of the assembled packet is past back to the PCI Host using the Receive Packet Descriptor Reference Ready (RPDRR) Queue.

In order to take advantage of burst transfers, the RRM reads up to six RPDs from each Free Queue and stores them locally. Once a packet has been reassembled, the RRM passes complete RPDs to the PCI host using the Receive Packet Descriptor Reference Ready (RPDRR) Queue.

All three Queues reside in PCI Host memory and are defined using a common based pointer residing in the PCID Receive Queue Base register and twelve offset pointers, four per queue.

Figure 11:
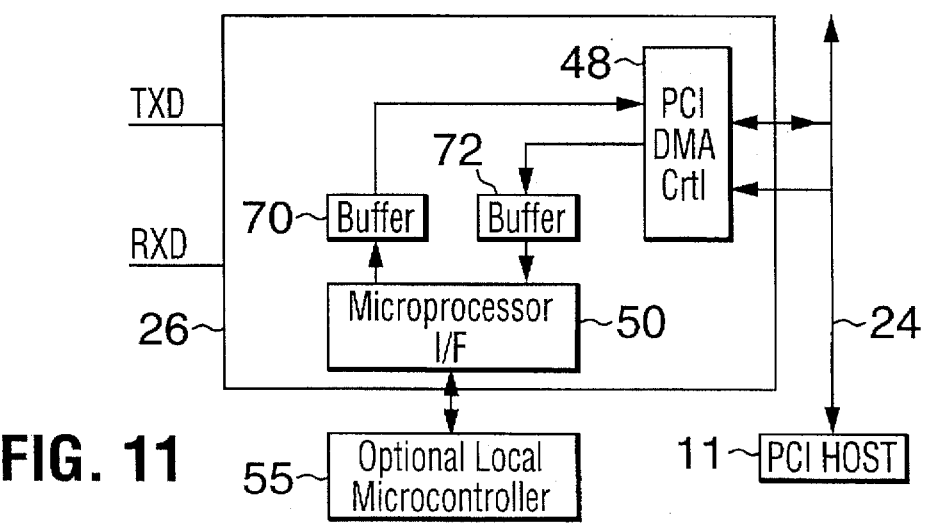
FIG. 11 is a schematic diagram of a mailbox configuration for communication between a local external processor and a PCI Host.

The microprocessor interface 50 is provided for device configuration, control and monitoring by an optional external local microcontroller 55 (see FIG. 11). For applications where local microprocessor control is not required, and all device operations are performed by the PCI Host, the microprocessor interface allows the PCI Host 11 access to the Lasar Local Bus.

When the interface 50 is configured in the slave mode operation, normal mode registers, test mode registers and the micro/PCI Host mailbox can be accessed through this port. Normal mode registers are required for normal operation, test mode registers are used to enhance the testability of the Lasar 26 and the micro/PCI Host mailbox allows communication between the microprocessor and PCI host without external support devices.

When the interface 50 is configured for master mode operation, the PCI Host can access the Lasar Local Bus. The Lasar Local Bus supports up to two devices without requiring any external logic.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. An ATM network interface, comprising:
   (a) a physical layer interface having
      (i) transmit and receive line interfaces;
      (ii) transmit and receive framers and overhead processors coupled to respective ones of said transmit and receive line interfaces; and
      (iii) transmit and receive cell processors coupled to respective ones of said transmit and receive framers and overhead processors;
   (b) a segmentation and reassembly interface coupled to said physical layer interface having
      (i) transmit and receive ATM and adaptation layer processors coupled to respective ones of said transmit and receive ATM cell processors; and
      (ii) a transmit ATM Traffic Shaper coupled to said Transmit ATM and Adaptation Layer Processor; and
   (c) means for coupling said segmentation and reassembly interface to a PCI bus
      wherein said segmentation and reassembly interface and said physical layer interface are combined on a monolithic substrate so as to avoid the need for external connection context memory and to eliminate interfaces so as to reduce the number of chip pins.

2. An ATM network interface according to claim 1, including a transmit multipurpose port coupled to an input of said transmit ATM and Adaptation Layer Processor to allow insertion of cells into a cell stream emanating from said transmit ATM and Adaptation Layer Processor.

3. An ATM network interface according to claim 1 or 2, including an a receive multipurpose port coupled to an output of said receive ATM and Adaptation Layer Processor to allow cell extraction of cells copied by said receive ATM and Adaptation Layer Cell processor.

4. An ATM network interface according to claim 1, including a transmit multipurpose port coupled to an input of said transmit ATM and Adaptation Layer Processor to allow insertion of cells into a cell stream emanating from said transmit ATM and Adaptation Layer Processor and a receive multipurpose port coupled to said receive ATM and Adaptation Layer Processor to allow cell extraction therefrom.

5. An ATM network interface according to claim 1, wherein a receive multipurpose port is coupled to an input of said Receive ATM & Adaptation Layer Processor when in an Utopia or SCI-PHY coupling.

6. An ATM network interface according to claim 1, wherein a transmit multipurpose port is coupled to an output of said transmit ATM & Adaptation Layer Processor when in a Utopia or SCI-PHY coupling.

7. An ATM network interface according to claim 1, wherein said transmit and receive framer and overhead processors each include section, line and path overhead processors coupled in series.

8. An ATM network interface according to claim 1, wherein said Transmit ATM Traffic Shaper includes an ATM variable bit rate cell scheduler.

9. An ATM network interface according to claim 1, wherein said coupling means is a peripheral component interconnect (PCI) controller coupled to said transmit and receive ATM and Adaptation Layer Processors.

10. An ATM network interface according to claim 1, wherein said coupling means further includes a direct memory access controller with scatter/gather capabilities.

11. An ATM network interface according to claim 10, wherein payloads of packets under reassembly are burst written into memory of a PCI Host without alerting the PCI Host until a complete packet has been reassembled thereby minimizing PCI Host interaction.

12. An ATM network interface according to claim 1, including a variable bit rate (VBR) cell scheduler.

13. An ATM network interface according to claim 12, wherein said VBR cell scheduler includes a Transmit ATM Traffic Shaper which provides peak rate enforcement using peak rate queues and average cell rate enforcement using peak rate queues coupled with token bucket averaging.

14. An ATM network interface according to claim 1, including a microprocessor interface for coupling to an external local microprocessor.

15. An ATM network interface according to claim 12, including a mailbox coupled to said external local microprocessor interface having two mailbox buffers with associated semaphores, one of said buffers for PCI Host to microprocessor communication and the other for microprocessor to PCI Host communication wherein registers in said ATM network interface under control of said external local microprocessor can be accessed by the PCI Host only through said mailbox buffers.

* * * * *